(12) United States Patent
Nishikawa et al.

(10) Patent No.: US 7,295,273 B2
(45) Date of Patent: *Nov. 13, 2007

(54) LIQUID CRYSTAL DISPLAY DEVICE HAVING PARTICULAR DRAIN LINES AND ORIENTATION CONTROL WINDOW

(75) Inventors: Ryuji Nishikawa, Gifu (JP); Yasushi Miyajima, Gifu (JP); Masayuki Koga, Anpachi-gun (JP); Mitsugu Kobayashi, Nagoya (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/466,333

(22) Filed: Aug. 22, 2006

(65) Prior Publication Data

US 2006/0285045 A1 Dec. 21, 2006

Related U.S. Application Data

(63) Continuation of application No. 09/447,378, filed on Nov. 23, 1999, now Pat. No. 7,119,870.

(30) Foreign Application Priority Data

| Nov. 27, 1998 | (JP) | ................................ 10-337840 |
| Nov. 30, 1998 | (JP) | ................................ 10-340500 |
| Oct. 27, 1999 | (JP) | ................................ 11-305804 |

(51) Int. Cl.
*G02F 1/1337* (2006.01)
*G02F 1/1333* (2006.01)

(52) U.S. Cl. .................. 349/129; 349/110; 349/130

(58) Field of Classification Search ........ 349/110–111, 349/130, 129

See application file for complete search history.

(56) References Cited

U.S. PATENT DOCUMENTS

| 5,473,455 A | 12/1995 | Koike et al. ................. 359/76 |
| 5,504,604 A | 4/1996 | Takatori et al. ............ 349/123 |
| 5,648,828 A | 7/1997 | Sakamoto et al. |
| 5,666,179 A | 9/1997 | Koma |
| 5,710,611 A | 1/1998 | Suzuki et al. |
| 5,796,458 A | 8/1998 | Koike et al. ............... 349/126 |
| 5,847,381 A | 12/1998 | Isogai ..................... 250/208.1 |
| 5,995,176 A | 11/1999 | Sibahara |
| 6,097,466 A | 8/2000 | Koma ........................ 349/143 |
| 6,115,097 A | 9/2000 | Yamazaki .................. 349/151 |
| 6,157,428 A | 12/2000 | Koma ........................ 349/138 |

(Continued)

FOREIGN PATENT DOCUMENTS

EP 0731374 9/1996

(Continued)

*Primary Examiner*—Mike Qi
(74) *Attorney, Agent, or Firm*—Hogan & Hartson LLP

(57) ABSTRACT

When the orientation of liquid crystal molecules in a pixel are divided by an orientation divider, a boundary of the orientation is produced at any part of the pixel. A drain signal line (54) is formed to overlap with the boundary so that a light-shielding region in the pixel is decreased and an aperture ratio can be improved. Leakage of light caused when the orientation is disturbed can be shielded by the drain signal line (54), and contrast can be enhanced. The orientation divider can be an orientation control window (36), an orientation control slope (90) or the like.

14 Claims, 17 Drawing Sheets

U.S. PATENT DOCUMENTS

| | | | |
|---|---|---|---|
| 6,256,082 B1 * | 7/2001 | Suzuki et al. | 349/144 |
| 6,278,503 B1 * | 8/2001 | Nishikawa et al. | 349/39 |
| 6,362,864 B2 | 3/2002 | Koma et al. | 349/138 |
| 6,369,870 B1 | 4/2002 | Koma | 349/130 |
| 6,456,352 B1 | 9/2002 | Matsuyama et al. | 349/143 |
| 6,521,474 B2 * | 2/2003 | Noritake et al. | 438/30 |
| 6,661,488 B1 | 12/2003 | Takeda et al. | |
| 6,724,452 B1 | 4/2004 | Takeda et al. | |
| 2004/0046901 A1 * | 3/2004 | Matsuoka et al. | 349/43 |
| 2006/0038948 A1 * | 2/2006 | Nishikawa et al. | 349/125 |
| 2007/0046875 A1 * | 3/2007 | Nishikawa et al. | 349/125 |
| 2007/0046876 A1 * | 3/2007 | Nishikawa et al. | 349/125 |

FOREIGN PATENT DOCUMENTS

| | | |
|---|---|---|
| EP | 0877283 | 11/1998 |
| JP | 01-169433 | 7/1989 |
| JP | 02-234127 | 9/1990 |
| JP | 05-173138 | 7/1993 |
| JP | 05-173142 | 7/1993 |
| JP | 05-232474 | 9/1993 |
| JP | 05-281545 | 10/1993 |
| JP | 06-118426 | 4/1994 |
| JP | 07-028063 | 1/1995 |
| JP | 07-159787 | 6/1995 |
| JP | 07-311383 | 11/1995 |
| JP | 08-43833 | 2/1996 |
| JP | 08-076125 | 3/1996 |
| JP | 08-136931 | 5/1996 |
| JP | 09-043610 | 2/1997 |
| JP | 09-152583 | 6/1997 |
| JP | 09-258266 | 10/1997 |
| JP | 11-242225 | 9/1999 |
| JP | 2003-379864 | 10/2003 |
| KR | 1996-0008386 | 3/1996 |

* cited by examiner

LIQUID CRYSTAL DISPLAY DEVICE HAVING PARTICULAR DRAIN LINES AND ORIENTATION CONTROL WINDOW

CROSS-REFERENCE TO THE RELATED APPLICATIONS

This is a continuation of application Ser. No. 09/447,378 filed Nov. 23, 1999, now U.S. Pat. No. 7,119,870, the entire contents of which are incorporated by reference. This application also claims benefit of priority under 37 C.F.R. § 119 to Japanese Patent Application No. 10-337840 filed Nov. 27, 1998, Japanese Patent Application No. 10-340500 filed Nov. 30, 1998 and Japanese Patent Application No. 11-305804 filed Oct. 27, 1999, the entire contents of all are incorporated by reference.

BACKGROUND OF THE INVENTION

1. Field of the Invention

The present invention relates to a liquid crystal display device provided with an orientation divider for dividing the orientation direction of a liquid crystal.

2. Description of the Related Art

FIG. 1 shows a plan diagram of a conventional liquid crystal display device. FIG. 2 shows a sectional diagram taken along line. B-B of FIG. 1 and FIG. 3 shows a sectional diagram taken along line D-D of FIG. 1.

In can be seen in FIG. 2 and FIG. 3 that a plurality of drain signal lines 50 and a plurality of gate signal lines 51 intersect each other on a first substrate 10 which is made of an insulating substrate such as glass or quartz, and in the vicinity of each intersection of lines 50 and 51 there are provided a thin-film transistor (hereinafter called TFT). Pixel electrodes 19 made of a transparent conductive film such as ITO (Indium Tin Oxide) are connected to sources 13s of the TFT. The drain signal lines 50 are intersected with the gate signal lines 51 and are overlapped with the pixel electrodes 19.

A storage capacitor electrode line 52 is disposed near the TFT in parallel to the gate signal line 51. The storage capacitor electrode line 52 is made of chromium and makes a storage capacitor for storing electric charges by forming a capacitor with an electrode 53 connected to the source 13s of the TFT through an interlayer insulating film 15. This storage capacitor is disposed to be electrically parallel to a liquid crystal 21 which is also a capacitor in order to suppress the electric charges stored in the liquid crystal 21 by a leak current of the TFT and to keep the stored electric charges.

An opposing electrode 34 on the side of a second substrate 30 is a common electrode which is formed to overlap the plurality of pixel electrodes 19. An orientation control window 36, which is formed by removing the ITO as an opposing electrode material so that one end of letter Y indicated by a dotted line in FIG. 1 is made to have the same forked shape as the other end, is disposed at positions corresponding to the respective pixel electrodes 19.

As can be seen in FIG. 2 and FIG. 3, the interlayer insulating film 15, the drain signal line 50 disposed for each pixel, and a planarization insulating film 17 are sequentially formed on the insulating substrate 10, while the pixel electrode 19 made of ITO is disposed for each pixel on the planarization insulating film 17. The pixel electrode 19 is disposed to overlap with the drain signal line 50. A vertical orientation film 20 for orienting the liquid crystal 21 is further disposed on the pixel electrode 19. A polarizer 41 is disposed on the opposite side of the insulating substrate 10 facing the liquid crystal 21.

A color filter 31 comprising red (R), green (G), and blue (B) for showing such colors and a black matrix for shielding light is disposed on the opposite side of the second substrate 30 facing the liquid crystal 21. A protective film 33 made of a resin is formed on the color filter 31 to protect its surface and the opposing electrode 34, which is made of a transparent conductive film of ITO or the like, is formed on the protective film 33. As described above, the orientation control windows 36 for controlling the orientation of the liquid crystal 21 are formed on the opposing electrode 34. A vertical orientation film 35 which vertically orients the liquid crystal 21 is disposed on the orientation control windows 36. A polarizer 42 is disposed on the opposite side of the second substrate 30 facing the liquid crystal 21. The polarizer 42 and the polarizer 41 are disposed so that their polarization axes intersect at right angles.

The insulating substrate 10 and the second substrate 20 are joined at their peripheries using a sealing adhesive agent (not shown), and a nematic liquid crystal 21 which has a negative anisotropy of dielectric constant is filled in a gap formed to complete a liquid crystal display panel. The orientation control windows 36 formed in the opposing electrode 34 are disposed at two positions for each pixel because the orientation control window 36 shows the forked shape in letter Y in FIG. 3.

The liquid crystal 21 has a negative anisotropy of dielectric constant. Here, the behavior of liquid crystal molecules will be described. In a state that a voltage is not applied to the liquid crystal 21, the liquid crystal molecules between the substrates 10 and 30 are vertically oriented with respect to the substrates 10, 30. Therefore, incident light which is linearly polarized by the polarizer 41 on the side of the TFT substrate 10 is not double refracted in the liquid crystal 21 but shielded by the polarizer 42 on the side of the second substrate 30 to show black. This is called a normally black method.

As shown in FIG. 2, when a voltage is applied to the liquid crystal 21, the major axes of the liquid crystal molecules are oriented in the vertical direction with respect to the electric flux line, but controlled to incline in a plurality of orientation directions with respect to one pixel electrode 19 by the electric flux line produced in a slanting direction at the end of the pixel electrode 19 and the end of the orientation control window 36. The incident light which is linearly polarized by the polarizer 41 becomes an elliptical polarized light upon receiving the double refractory by the liquid crystal 21 which has a negative anisotropy of dielectric constant so to pass through the polarizer 42 and have a transmissivity corresponding to a voltage of the drain signal line.

Thus, when the orientation direction of the liquid crystal is divided into multiple numbers in the pixel, the respective regions have a different viewing angle characteristic so that the viewing angle of the pixels as a whole can be enlarged.

In this specification, a means for dividing the orientation direction of the liquid crystal (orientation divider) is indicated as an orientation divider. In addition to the orientation divider described above, other arts, such as an orientation control slope or division of a rubbing direction into multiple numbers, have been proposed.

In the state that a voltage is applied to the liquid crystal 21, however, the liquid crystal molecules as a continuous body are continuously inclined to allow the passage of light according to an electric field produced at the edge of the orientation control window 36 outside the region of the orientation control window 36 formed on the opposing electrode 34, but, in the region of the orientation control window 36, the liquid crystal molecules remain in the vertically oriented state with respect to the substrates 10, 30, so that the light does not pass through the orientation control window and a light-shielding state is kept.

Even when an orientation divider other than the orientation control window is used, a boundary in the orientation direction of the liquid crystal may exist at any position. Such a boundary in the orientation direction is consistently in a state of shielding the light in a normally black mode type and in a state of allowing the light in a normally white mode type because the orientation does not change even if a voltage is applied to between the electrodes.

As shown in FIG. 1 through FIG. 3, the drain signal lines 50 overlap with the pixel electrodes 19 and made of a light-shielding material such as metal. However, when the drain signal line 50 is disposed between the pixel electrodes 19, the liquid crystal is oriented by a signal voltage applied to the drain signal line 50, which results in degraded display quality.

Therefore, there are disadvantages in the conventional art that an effective display region in the pixel electrode forming region must decreased because of the orientation control windows 36 and the drain signal lines 50, an aperture ratio was heavily degraded, and a bright display could not be obtained.

SUMMARY OF THE INVENTION

The present invention was conceived in response to the disadvantages described above. It is an object of the present invention to provide a liquid crystal display device which has a wide viewing angle and can provide bright display with an improved aperture ratio.

The invention was created to remedy the disadvantages as described above. The invention is a liquid crystal display device which controls the orientation of a liquid crystal by means of a plurality of pixel electrodes formed for each pixel and an opposing electrode formed to cover the plurality of pixel electrodes, which has an orientation divider for dividing an orientation direction of the liquid crystal into a plurality of orientation directions within a single pixel and a light-shielding film formed to overlap with boundaries of the orientation directions of the liquid crystal formed by the orientation divider.

According to another aspect of the invention, the liquid crystal of the liquid crystal display device is sealed between a first substrate and a second substrate which are disposed so as to oppose each other; the first substrate has gate signal lines, drain signal lines, and switching elements connected to the gate signal lines and the drain signal lines; the pixel electrodes are connected to the switching elements; and the opposing electrode is formed on the second substrate to oppose the liquid crystal.

Thus, the present invention has an orientation divider for dividing the orientation direction of the liquid crystal into a plurality of directions in a single pixel, and a light-shielding film is disposed to overlap with the boundaries of the orientation directions produced by the orientation divider. The boundaries of the orientation directions of the liquid crystal exhibit a light-shielding function under a normal situation, so that an area of the light-shielding region for each pixel does not change, even when the light-shielding film overlaps the boundaries. As compared with a liquid crystal display device which has the light-shielding film formed not to overlap with the boundaries of the orientation, the area of the light-shielding region can be decreased, and an aperture ratio of the liquid crystal display device can be improved.

In a plan view, the light-shielding film overlaps the boundaries of the orientation directions of the liquid crystal, so that light can be prevented from leaking out of the liquid crystal display device by virtue of the presence of the light-shielding film. Even if the orientation of the liquid crystal is disturbed in the vicinity of the boundary in the orientation direction of the liquid crystal to weaken a light-shielding property at the boundary, higher contrast images can still be displayed.

According to another aspect of the invention, the orientation divider divides the orientation directions of the liquid crystal by generating an electric field which is inclined with respect to the normal line of the pixel electrode and/or the opposing electrode.

In the liquid crystal display device which divides the orientation directions of the liquid crystal by forming the electric field which is inclined with respect to the normal line of the pixel electrode and/or the opposing electrode, orientation direction restraint ability of the orientation divider is weak compared with when the orientation is controlled by rubbing or the like, so that the orientation of the liquid crystal tends to be disturbed, and light may leak in the vicinity of the boundary in the orientation direction. The present invention, however, can securely shield the light in the vicinity of the boundary in the orientation direction because the light-shielding film is disposed to overlap with the boundary.

According to another aspect of the present invention, the light-shielding film is a conductive substance made of metal, e.g., the drain signal line. When a storage capacitor electrode for forming the storage capacitor on each pixel electrically connected in parallel with the liquid crystal is provided, the storage capacitor electrode can also be used as the light-shielding film.

According to still another aspect of the present invention, the liquid crystal has a negative anisotropy of dielectric constant, and a vertical orientation film is formed to cover the pixel electrodes.

Thus, by using as the light-shielding film the storage capacitor electrode when the conductive substance is made of metal, e.g., the drain signal line or the storage capacitor electrode, is provided, an aperture ratio is not substantially lowered, even when the drain signal line or the storage capacitor electrode is disposed in the pixel region.

Where the drain signal line is disposed between the pixels, the electric field produced by the drain signal line leaks to a layer of the liquid crystal and the orientation direction of the liquid crystal may be disturbed because the drain signal line is not shielded by the pixel electrode. However, where the drain signal line is arranged to overlap with the boundary in the orientation direction, the aperture ratio is not lowered even if the drain signal line is present in the pixel region. Therefore, the drain signal line can be disposed on a layer below the pixel electrode. Then, the electric field of the drain signal line can be shielded by the pixel electrode, and the orientation of the liquid crystal can be prevented from being disturbed.

According to still another aspect of the present invention, the orientation divider is an orientation control window, which is formed at a position to overlap with the pixel electrode of the opposing electrode, or an orientation control slope.

According to a still further aspect of the present invention, the orientation control slope is formed by having a projection made of an insulating substance formed on the pixel electrode and/or the opposing electrode.

The orientation control slope may be formed by having a projection made of an insulating substance formed between the pixel electrode and the first substrate and/or between the opposing electrode and the second substrate.

According to yet another aspect of the invention, a liquid crystal display device is characterized in that liquid crystal is sealed between a first substrate and a second substrate which are disposed so as to oppose each other; the first substrate has switching elements connected to gate signal lines and drain signal lines, pixel electrodes which are connected to the switching elements and made of a conductive material and a vertical orientation film for orienting the liquid crystal; the second substrate has an opposing electrode which has the orientation control window (formed as an orientation divider) at positions that overlap with the pixel electrodes to control the orientation of the liquid crystal and a vertical orientation film for orienting the liquid crystal; and the drain signal lines are disposed on the first substrate at positions that overlap with the orientation control windows.

According to yet another aspect of the invention, a liquid crystal display device is characterized in that liquid crystal is sealed between a first substrate and a second substrate which are disposed so as to oppose each other; the first substrate has gate signal lines, drain signal lines, switching elements connected to the gate signal lines and the drain signal lines, pixel electrodes connected to the switching elements and made of a conductive material, storage capacitor signal lines for forming the storage capacitors with semiconductor layers of the switching elements, and a vertical orientation film for orienting the liquid crystal; the second substrate has an opposing electrode which controls the orientation of the liquid crystal and has the orientation control windows (formed as an orientation divider) at positions that overlap with the pixel electrodes and a vertical orientation film for orienting the liquid crystal; and a part of the gate signal lines, a part of the storage capacitor signal lines and the drain signal lines are disposed on the first substrate at positions that overlap with the orientation control windows.

According to another aspect of the invention, the orientation divider such as the orientation control window has a width different from that of the light-shielding film or the signal line overlapping the orientation control window or the like.

Because the width of the orientation control window is thus different from the width of the signal line overlapping it, specifically the drain signal line, and when a part of the gate signal line and the storage capacitor signal line also overlaps the orientation control window, the width of a part of the gate and the storage capacitor signal line, the orientation can be prevented from being disturbed and the light from leaking, even if the orientation control window and the drain signal line or the like are not correctly aligned.

According to a still further aspect of the present invention, the pixel electrodes are disposed in a matrix; the drain signal lines are connected to a plurality of pixel electrodes in the same column via the switching elements; the pixel electrodes which are connected to the same drain signal line and positioned in the mutually adjacent rows are disposed to displace by a distance corresponding to about 1.5 pixels or smaller in a direction that the gate signal lines are extended.

For example, the pixel electrodes positioned on the adjacent rows are displaced by about 1.2 pixels from each other, and the pixel electrodes connected to the same drain signal line have a corresponding color filter with the same color.

Where the pixel electrodes (the electrodes designed to indicate the same color) positioned on the adjacent rows are in a so-called delta arrangement in which they are displaced by about 1.5 pixels in the direction that the gate signal lines are extended, the drain signal lines are disposed in a meandering or zigzag pattern so that the drain signal lines overlap the boundaries in the orientation directions of the liquid crystal of the respective displaced pixels. Thus, an aperture ratio is prevented from lowering, light can be prevented from leaking from the respective pixels, and the display quality of the device can be improved. Also, where the displacement of the pixels between the neighboring rows is smaller than 1.5 pixels (e.g., 1.2 pixels), the drain signal line extends while bending to pass through the pixel regions of the same color in the same way as the delta arrangement but its length is shorter than that in the delta arrangement. Therefore, the drain signal line can have a lower resistance than in the delta arrangement.

In another aspect, the present invention is in the form of a liquid crystal display device for displaying by controlling the orientation of a liquid crystal of each pixel by means of a plurality of pixel electrodes formed for respective pixels and an opposing electrode disposed to oppose the plurality of pixel electrodes with the liquid crystal therebetween, which comprises an orientation divider for forming a boundary in the orientation direction of the liquid crystal in a single pixel; wherein a light-shielding film is disposed so that at least a part of it is arranged through the pixel electrode region so to overlap with the boundary in the orientation direction of the liquid crystal.

According to another aspect of the present invention, the light-shielding film is a drain signal line for supplying the switching element disposed for each pixel with a display signal in order to control the orientation of the liquid crystal for each pixel.

Thus, even when the drain signal line passes through the pixel electrode regions, the aperture ratio is not lowered because the drain signal line inherently passes along the boundary in the orientation direction of the liquid crystal.

According to still another aspect of the present invention, in the aforesaid liquid crystal display device, a plurality of pixels are disposed as a matrix and corresponded with any of red, green, and blue colors to be displayed; the pixels having the same color are displaced from each other in a direction of the tow between the adjacent rows; and the drain signal line is extended in a direction of the column in a zigzag form so to overlap with at least a part of the boundary in the orientation direction of the liquid crystal formed in the pixel electrode region of the pixels with the same color displaced in the respective rows and supplies the pixels of the same color with a display signal through the switching element.

And, according to a still further aspect of the invention, in the aforesaid liquid crystal display device, the drain signal line is bent to extend in a direction of the column so to cross the one and same pixel electrode region a plurality of times.

DESCRIPTION OF THE PREFERRED EMBODIMENTS

First Embodiment

A liquid crystal display device of the present invention will be described.

Figure 4:
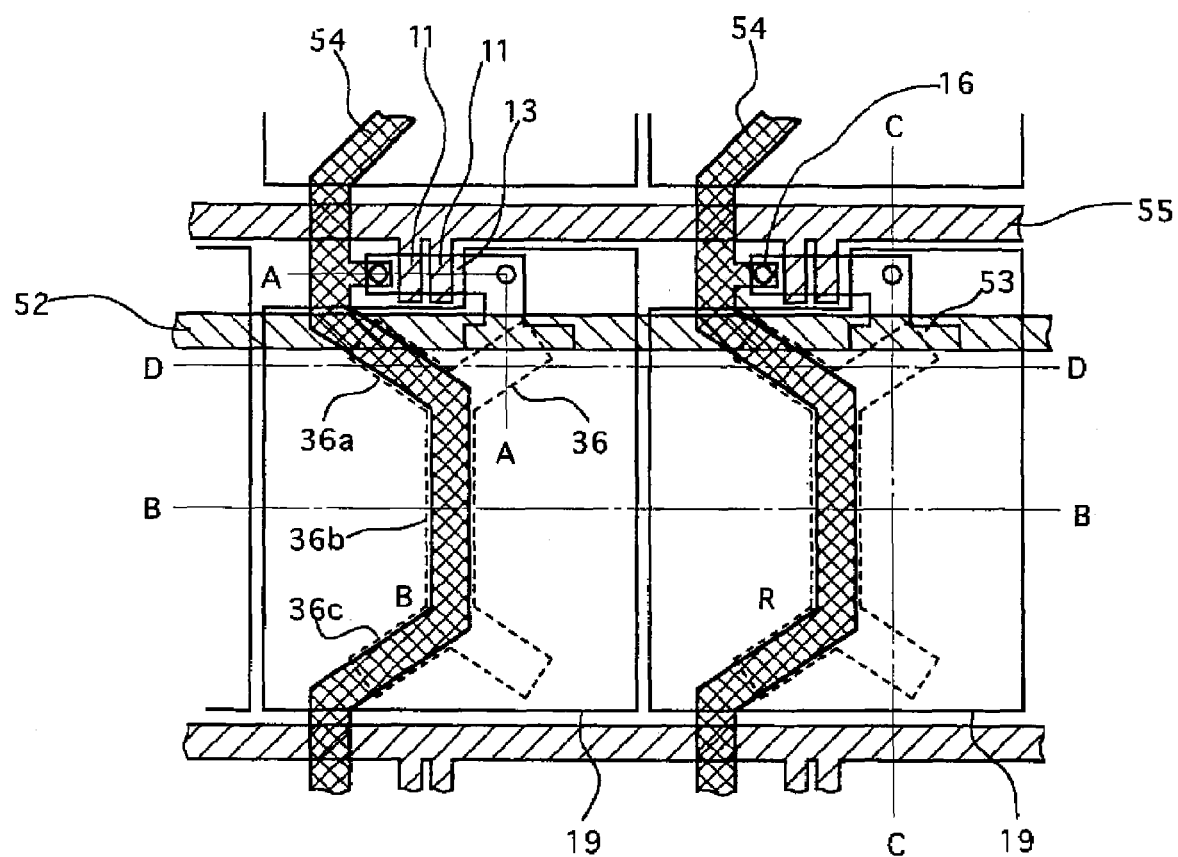
FIG. 4 is a plan diagram of a liquid crystal display device according to a first embodiment of the invention.
Figure 5:
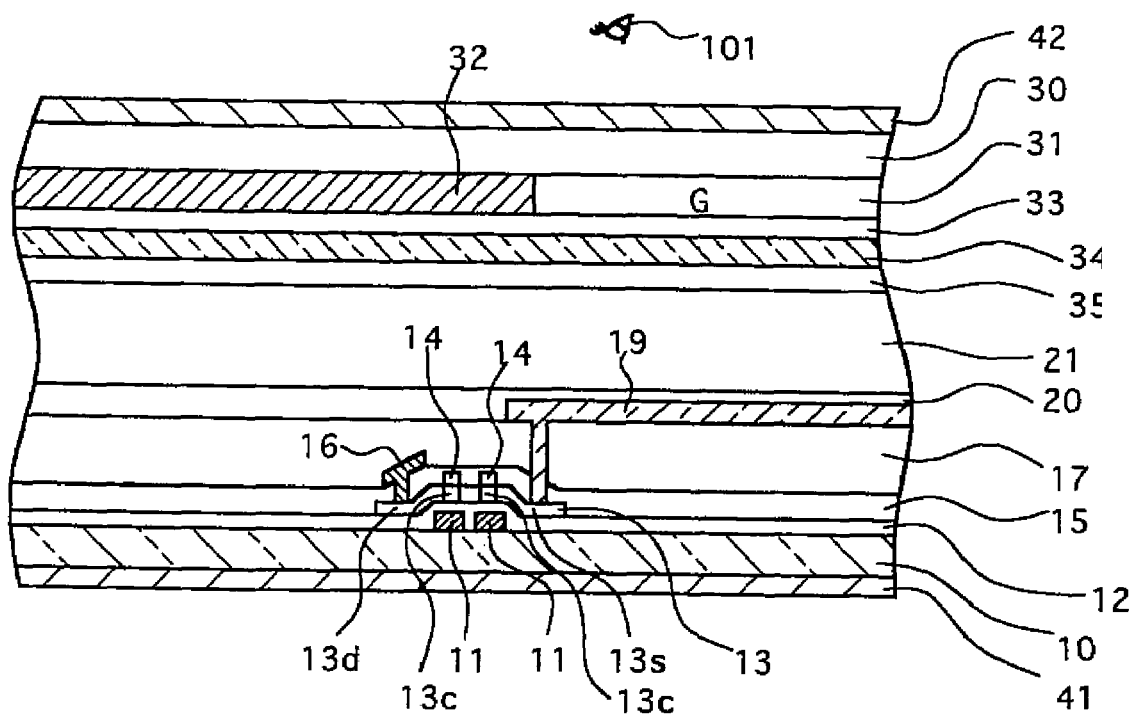
FIG. 5 is a sectional diagram of the liquid crystal display device taken along line A-A of FIG. 4.
Figure 6:
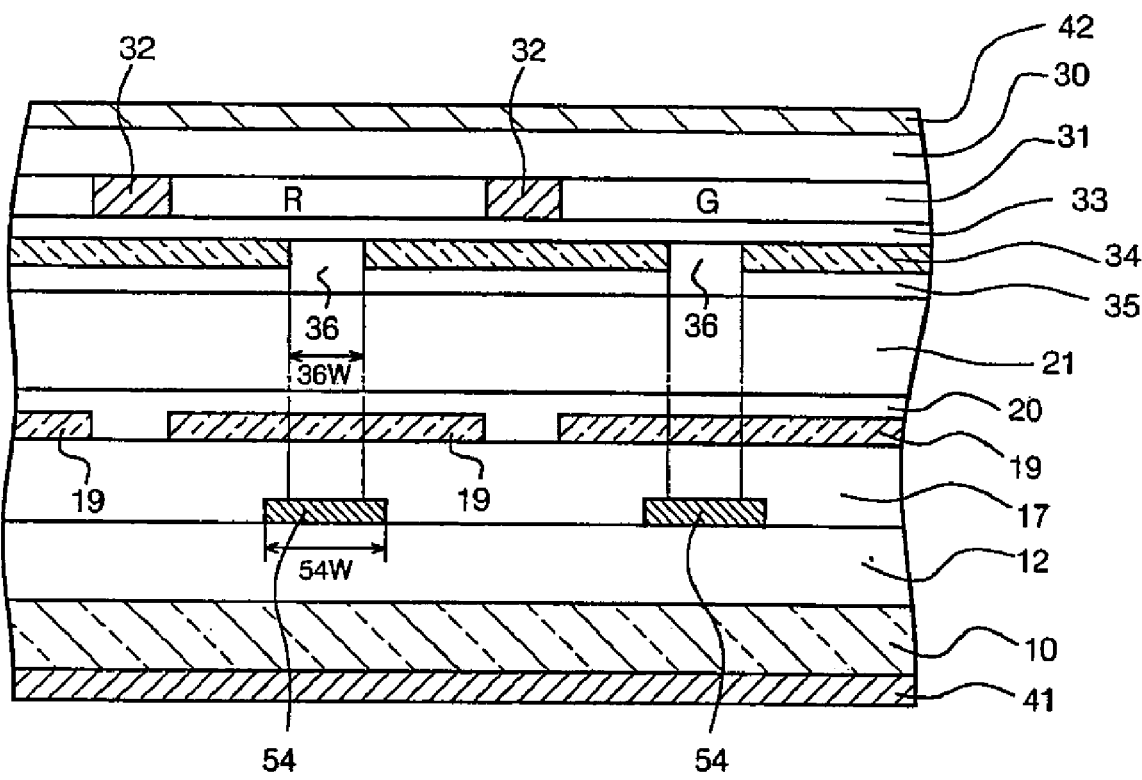
FIG. 6 is a sectional diagram of the liquid crystal display device taken along line B-B of FIG. 4.

FIG. 4 is a plan diagram of a liquid crystal display device of the invention, FIG. 5 is a sectional diagram of the liquid crystal display device taken along line A-A of FIG. 4, and FIG. 6 is a sectional diagram of the liquid crystal display device taken along line B-B of FIG. 4.

As shown in FIG. 4, a plurality of gate signal lines 55 each integrally having a gate electrode 11 are disposed horizontally, and a plurality of drain signal lines 54 are disposed vertically. A thin-film transistor (TFT), which is a switching element, is disposed in the vicinity of each intersection of the gate signal line 55 and the drain signal line 54, and a pixel electrode 19 made of a transparent conducting material such as ITO is connected to the TFT.

Figure 1:
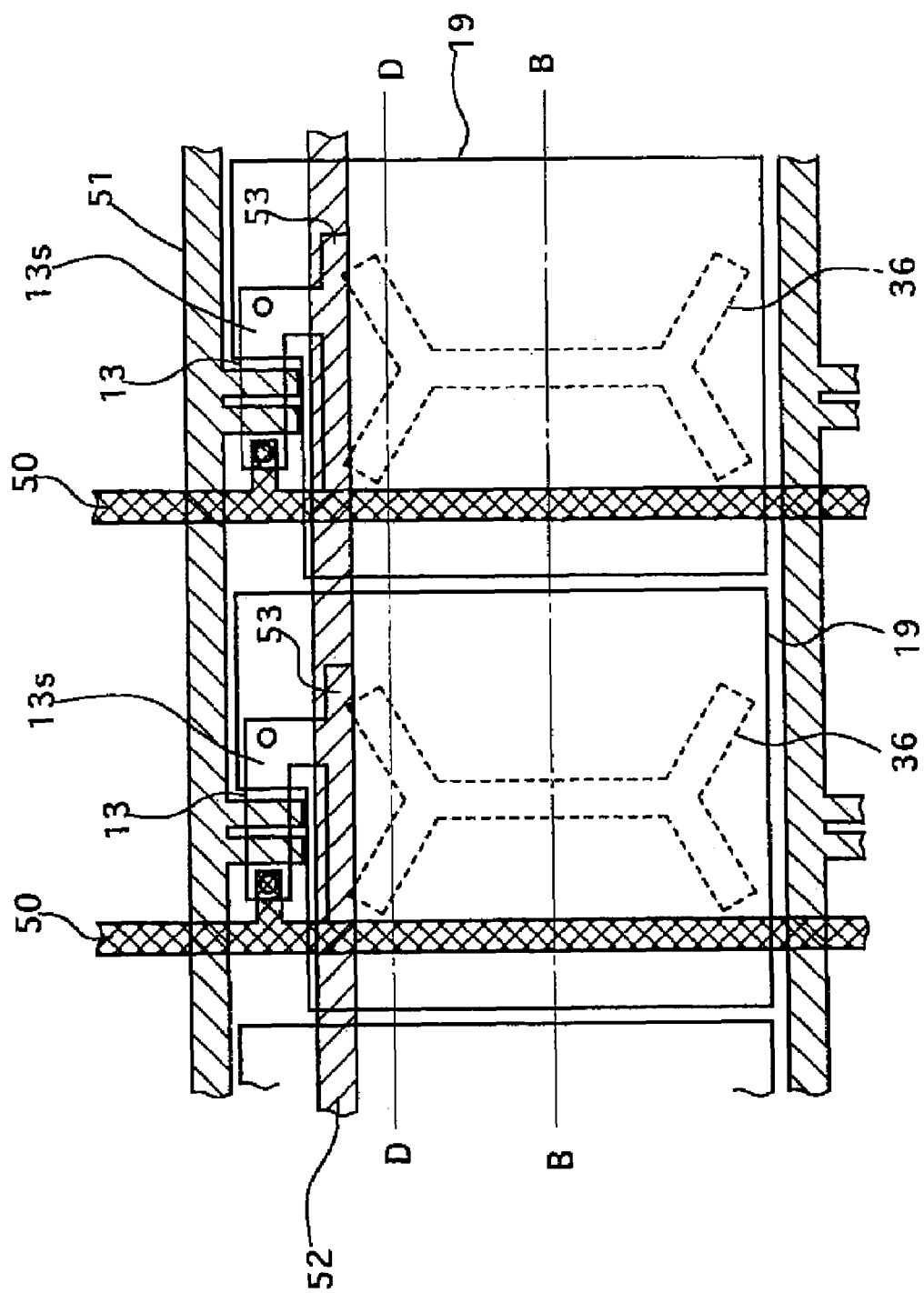
FIG. 1 is a plan diagram of a conventional liquid crystal display device.
Figure 2:
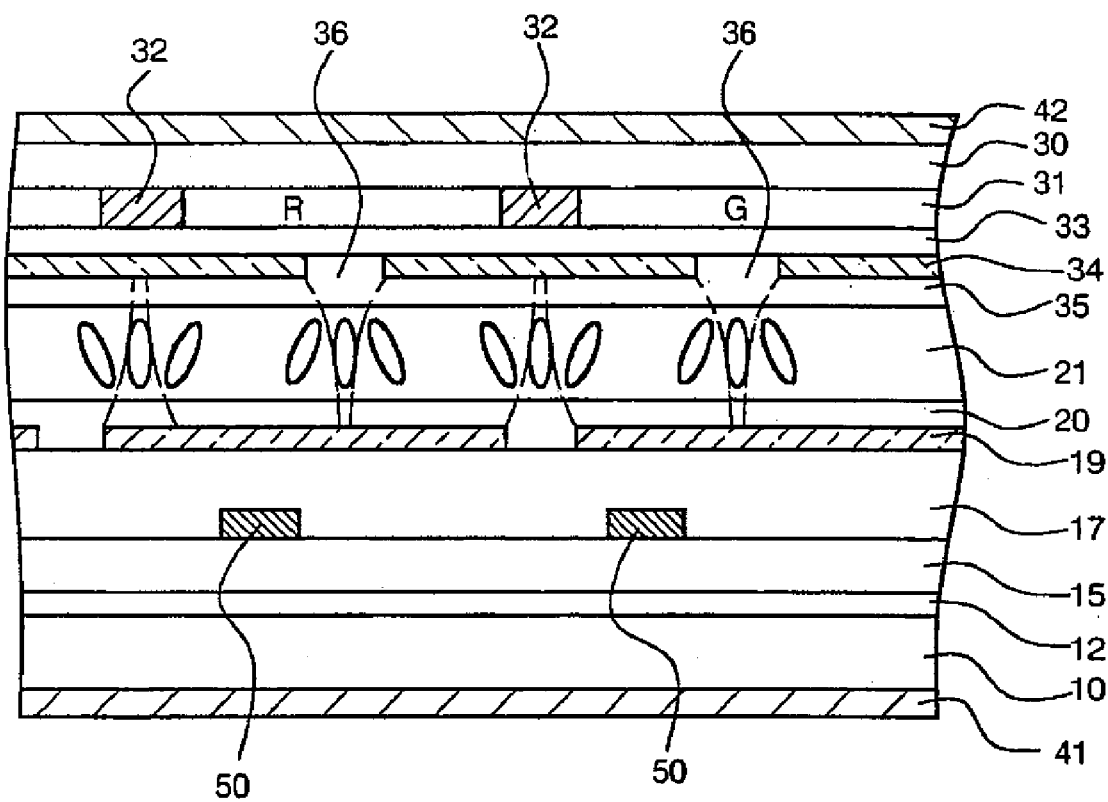
FIG. 2 is a sectional diagram of the liquid crystal display device taken along line B-B of FIG. 1.
Figure 3:
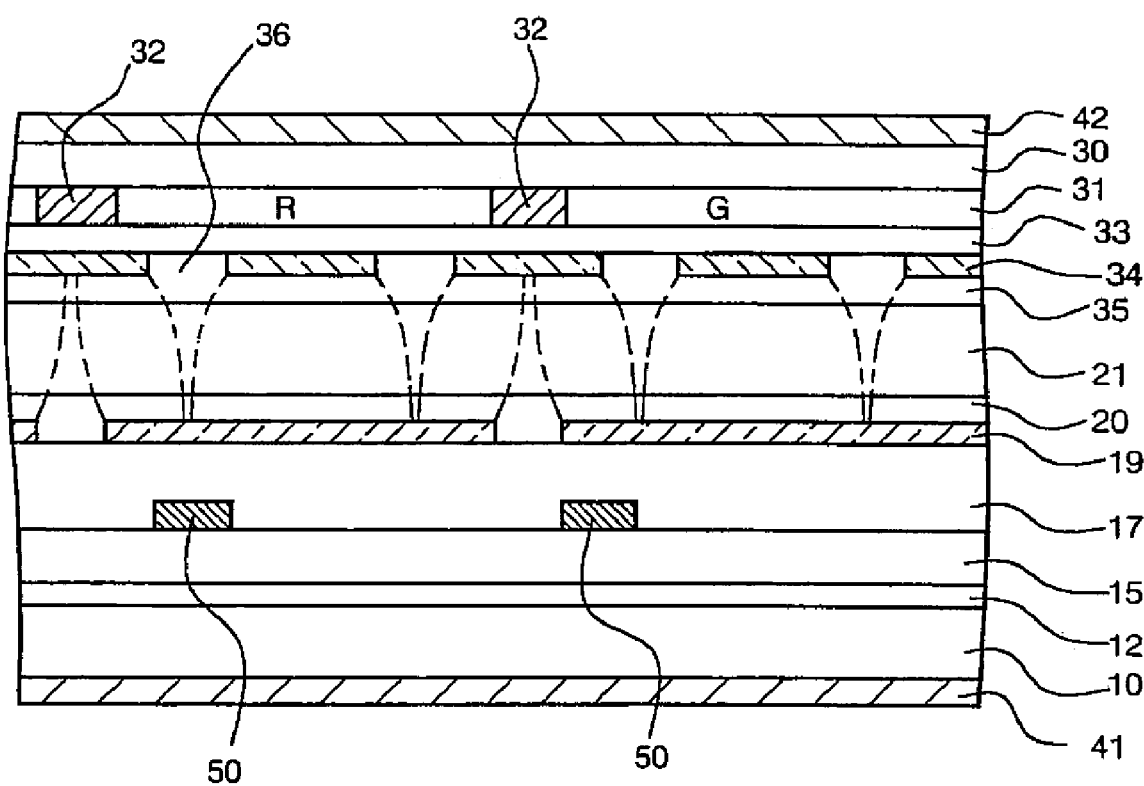
FIG. 3 is a sectional diagram of the liquid crystal display device taken along line D-D of FIG. 1.

FIG. 4 shows that orientation control windows 36, which are formed by removing the ITO, which is a material for the opposing electrode in the same way as shown in FIG. 1, are disposed on the same side of an opposing electrode 34 facing a second substrate 30. The orientation control window 36 has a shape that the bottom end of letter Y indicated by a dotted line has the same forked shape as the top end, namely two letters Y are mutually connected with one of them turned upside down. In other words, the orientation control window 36 has a shape that either end of its center region, which is rectangular and extending in a longitudinal direction of each pixel, is forked into two to extend toward two corners of the pixel.

The structure described above is substantially the same as that of a conventional liquid crystal described elsewhere in this specification. A feature of this embodiment is that the drain signal line 54 is formed along the orientation control window 36 disposed on the second substrate 30. In FIG. 4, the drain signal line 54 in the vicinity of the TFT enters the pixel region from its upper left, bends to extend in the lower right-hand direction to follow a branch section 36a at the upper left part of the orientation control window 36, and at a section 36b of the orientation control window 36 extending vertically in FIG. 4, extends vertically in the same way. The drain signal line 54 further bends to extend in the lower left direction to follow a branch section 36c extending in a lower left direction of the orientation control window 36, leaves the pixel from its lower left, and extends to a pixel in the next row. Thus, the drain signal line 54 is disposed to overlap with the left-side branch sections and the vertical section of the orientation control window 36.

The liquid crystal immediately below the orientation control window 36 keeps a vertically oriented state because an electric field is not produced and the orientation is not controlled. Therefore, it becomes a light-shielding region which always does not allow the passage of light. In this embodiment, the drain signal line 54 which is a metal line and has a light-shielding function is disposed there, so that the two light-shielding regions are overlapped. As a result, the light-shielding region occupying the pixel region becomes small, and an aperture ratio is improved. The region immediately below the orientation control window 36 is a boundary of the liquid crystal in its orientation direction in the pixel, so that the orientation direction tends to be disturbed. When the orientation direction is disturbed, light may leak erroneously. But, since the drain signal line 54 having the light-shielding function is disposed in this embodiment, the present invention can prevent the light from leaking and can further enhance contrast.

It is here desirable that a width 54w of the drain signal line 54 be different from a width 36w of the orientation control window 36. If they have the same size, the drain signal line 54 and the orientation control window 36 are displaced from each other when both the substrates 10, 30 are bonded but not correctly aligned. Therefore, the region for shielding the light is increased for the segment of the displacement, the aperture ratio is lowered, and the respective pixels are made to have variable aperture ratios. By having either of the widths made lager than the other in advance, the light-shielding region does not come to have a width larger than the predetermined width when the displacement is within a range of the difference in width even if the bonding is made with some displacement. Thus, variations among the respective pixels can be prevented. Either of the widths 54w and 36w may be made larger, but if the width 36w of the orientation control window 36 is excessively narrow, the orientation direction cannot be divided securely, so that it is desirable to make the width 36w of the orientation control window 36 larger. However, when the width 54w of the drain signal line 54 is made large, its electric resistance can be lowered, so that when the width 36w of the orientation control window 36 is sufficiently secured, the width 54w of the drain signal line 54 can be made much larger. In this embodiment, the orientation control window 36 is determined to have a width of 6 to 8 μm for example, then the drain signal line 54 is determined to have a width of 4 μm.

Next, a sectional structure of the liquid crystal display device taken along line A-A of FIG. 4 will be described. As shown in FIG. 5, a gate electrode 11 made of refractory (high melting point) metal such as chromium (Cr) or molybdenum (Mo), a gate insulating film 12, and an active layer 13 made of a polysilicon film are formed in this order on an insulating substrate 10 made of quartz glass, non-alkali glass or the like.

In an active layer 13, a channel 13c is disposed above the gate electrode 11, and a source 13s and a drain 13d, which are formed by ion doping with a stopper insulating film 14 on the channel 13c used as a mask, are disposed on either side of the channel 13c.

An interlayer insulating film 15 comprising $SiO_2$ film, SiN film, and then $SiO_2$ film laminated in this order is formed to fully cover the gate insulating film 12, the active layer 13, and the stopper insulating film 14, and metal such as Al is filled into a contact hole formed to correspond to the drain 13d to form a drain electrode 16. Further, a planarization insulating film 17 which is made of, for example, an organic resin is formed to fully cover the interlayer insulating film 15 to provide a flat surface. A contact hole is formed in the planarization insulating film 17 at a position corresponding to the source 13s, and a pixel electrode 19 which is made of a transparent conductive material such as ITO and in contact with the source 13s through the contact hole is formed on the planarization insulating film 17. A vertical orientation film 20, which is made of an organic resin such as a polyimide and vertically orients a liquid crystal 21 having a negative anisotropy of dielectric constant, is formed on the pixel electrode 19. Rubbing treatment of the vertical orientation film 20 is not required. A polarizer 41 is disposed on the outside of the insulating substrate 10, namely on the side not facing to the liquid crystal.

A color filter 31 comprising respective colors R, G, and B, and a black matrix 32 having a light-shielding function and a protective film 33 made of an acrylic resin or the like for protecting the color filter 31 are disposed inside of the second substrate 30, specifically on the side facing the liquid crystal 21 of the second substrate 30. The opposing electrode 34 which is opposed to the respective pixel electrodes 19 and partly provided with the orientation control window 36 is disposed on the protective film 33. A vertical orientation film 35 made of a polyimide is formed on the entire surface of the opposing electrode 34.

A polarizer 42 is disposed on the opposite side of the second substrate 30 facing the liquid crystal 21, being the side where a viewer 101 will view the display.

In addition, the liquid crystal 21 used is one having a negative anisotropy of dielectric constant. Specifically, the liquid crystal shall have the liquid crystal molecules vertically oriented with respect to the substrate when a voltage is not applied and oriented substantially in parallel when a voltage is applied.

The insulating substrate 10 having the TFT produced as described above and the opposing substrate 30 provided with the orientation film 35 and the opposing electrode 34 facing the substrate 10 are mutually adhered by applying a sealing adhesive agent (not shown) to their peripheries. Liquid crystal 21 is filled into the space formed between them to complete the liquid crystal display panel.

By disposing the drain signal line 54 at the position corresponding to the orientation control window 36 as described above, the boundary in the orientation direction can be overlapped with the region keeping to shield light, which is called wiring. In other words, a portion of light shielding effected by a conventional drain signal line can be removed, and the aperture ratio can be improved. Because the width of the drain signal line 54 differs from that of the orientation control window 36, the light-shielding section does not have a width exceeding the predetermined level, and the aperture ratios of respective pixels do not vary.

Second Embodiment

Figure 7:
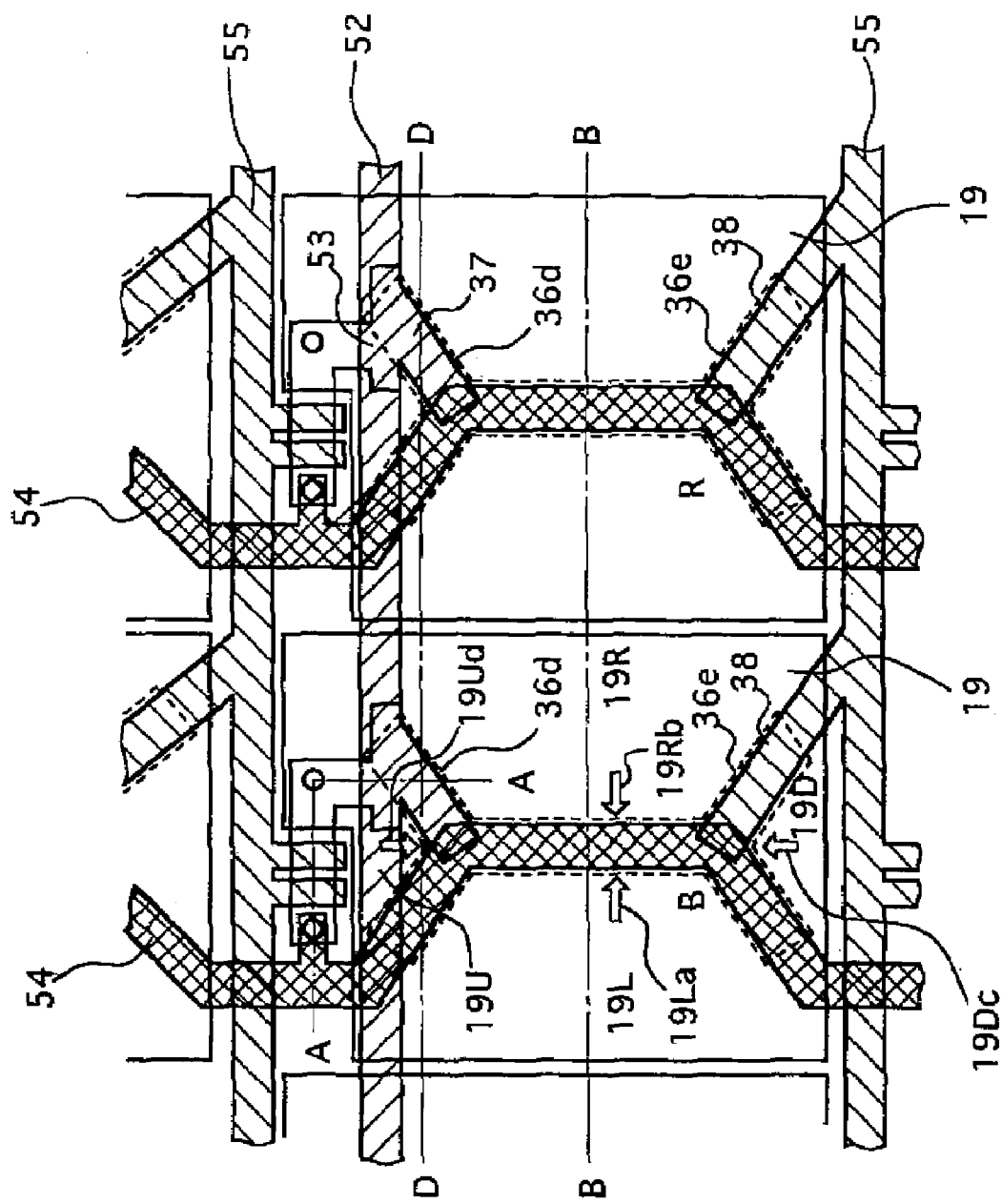
FIG. 7 is a plan diagram of a liquid crystal display device according to a second embodiment of the invention.
Figure 8:
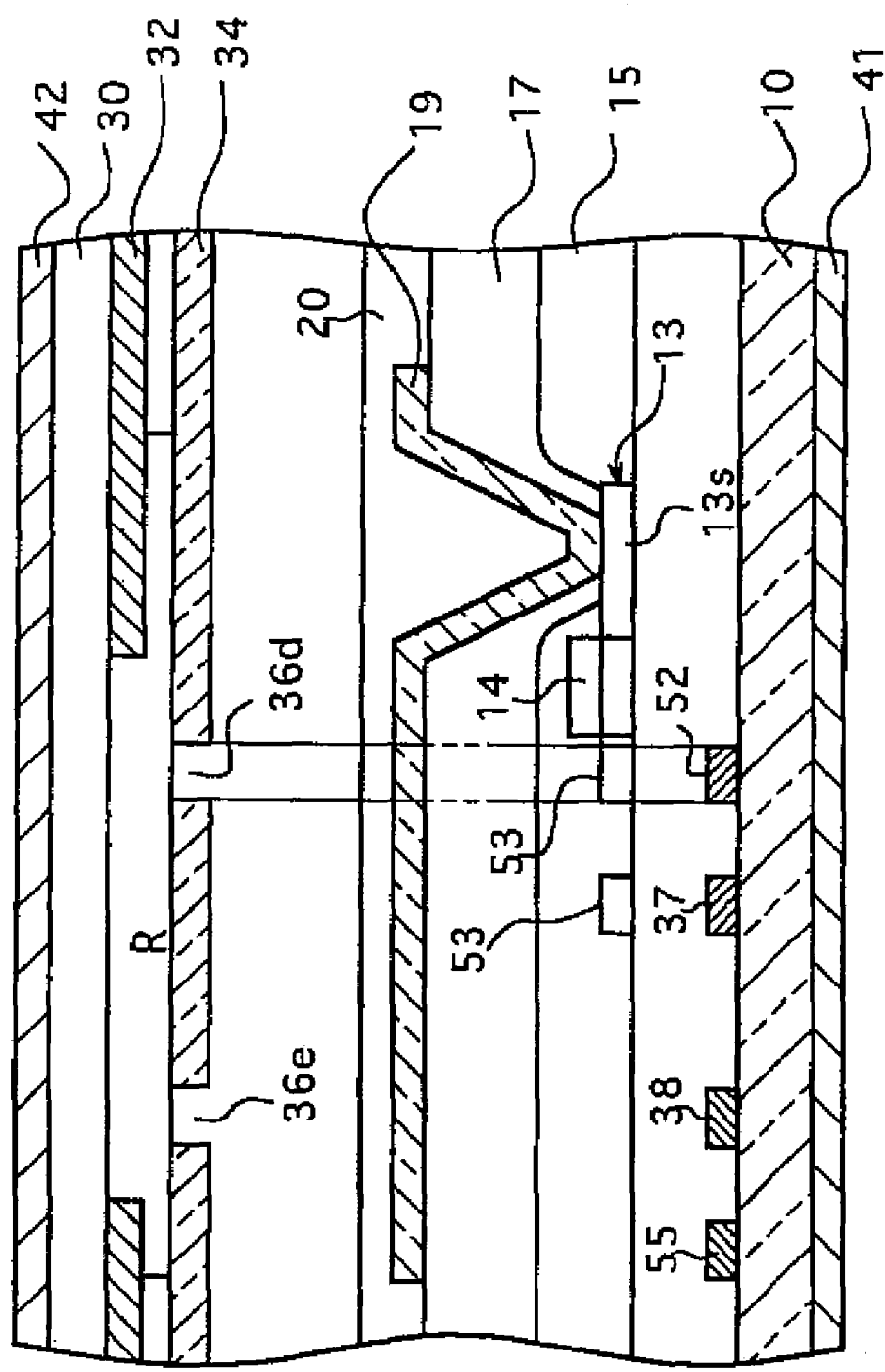
FIG. 8 is a sectional diagram of the liquid crystal display device taken along line C-C of FIG. 7.

FIG. 7 is a plan diagram of a liquid crystal display device according to a second embodiment of the present invention, and FIG. 8 is a sectional diagram of the liquid crystal display device taken along line C-C of FIG. 7. This embodiment corresponds to that of the first embodiment in that the drain signal lines 54 are disposed at the positions corresponding to the orientation control windows 36 formed on the opposing electrode 34, but differs in that portions 36d, 36e of the orientation control window 36, which are not covered with the drain signal line 54, overlap regions 37, 38 branched from a storage capacitor electrode 53 and the gate signal line 55 to fully cover the orientation control window 36.

The structure of the liquid crystal display device of this embodiment will be described with reference to FIG. 7 and FIG. 8. The gate signal lines 55 which have gate electrodes 11 partly made of refractory (high melting point) metal such as Cr or Mo, and storage capacitor electrode lines 52 are simultaneously formed on the insulating substrate 10 made of quartz glass, non-alkali glass or the like as shown in the drawings. At this point, the gate signal lines 55 and the storage capacitor electrode lines 52 correspond to the orientation control windows 36 by their portions 37, 38 to cover the sections which are not covered with the drain signal line 54. Specifically, as shown in FIG. 7, the orientation control window 36e on the side close to the gate signal line 55 has a part of the gate signal line 55 indirectly overlapping the overlap electrode 38 having a shape corresponding to the orientation control window 36, and an orientation control window 36d on the side close to the other storage capacitor electrode line 52 has a part of the storage capacitor electrode 53 indirectly overlapping the overlap electrode 37 having a shape corresponding to the orientation control window 36.

Thus, the aperture ratio can be improved by having the drain signal lines 54 overlapped with the orientation control windows 36 which are always in the light-shielding state in the same way as in the first embodiment.

The division of the orientation division in this embodiment is controlled according to the direction of the electric field only, so that restraint ability of the orientation direction of the liquid crystal is low as compared with, for example, the rubbing treatment. Therefore, the orientation may be disturbed by an external factor such as an external magnetic field. On the other hand, in this embodiment, even a region which does not overlap with the drain signal line 54 of the orientation control window 36 is arranged to overlap with the overlap electrodes 37, 38, so that the shielding of light by the orientation control window 36 of the pixel can be made perfect. Therefore, even if light leaks in case of the disturbance of the orientation of the liquid crystal of the orientation control window 36, it can be shielded completely, and complete black display can be made when black color is displayed. Thus, high-contrast display can be made.

Since the storage capacitor electrode 53 made of the same polysilicon film as the active layer 13 is disposed to overlap with the overlap electrode 37 branched from the storage capacitor electrode line 52, the storage capacitor is increased. Further, because the storage capacitor electrode 53 overlaps the orientation control window 36, the aperture ratio is not lowered by the increase in area of the storage capacitor.

It is desirable that either the drain signal line 54 or the orientation control window 36 have a width larger than the other in the same way as in the first embodiment. Similarly, the overlap electrodes 37, 38 and the orientation control windows 36d, 36e preferably have a different width so that either pair of them has a larger width than the other pair.

As shown in FIG. 7, a single pixel is divided into four regions 19U, 19D, 19R and 19L by the orientation control window 36 and the drain signal line 54. Among them, it is preferable that the pixel region 19L on the left side of the drain signal line 54 has the same area as the pixel region 19R on its right side.

At an end of the pixel electrode 19, the liquid crystal molecules are stabilized by having an angle of inclination from the direction of the normal line depending on the intensity of the electric field controlled and the direction of inclination controlled by the electric field produced obliquely to expand toward the opposing electrode 34.

The directions of inclination of the liquid crystal molecules at the ends of the pixel electrode 19 are different among the four regions divided by the orientation control window 36.

The liquid crystal molecules having their orientation controlled in different directions in the respective regions of the pixel electrode 19 are influenced toward the center of the pixel electrode because of the continuity of the liquid crystal. Specifically, the orientation direction of the liquid crystal molecules in the vicinity of the center is controlled so as not to be substantially oblique with respect to the direction of the normal line of the panel due to the presence of the orientation control window 36 disposed on the opposing electrode 34 and less influenced by the orientation control by the orientation control window 36 as the liquid crystal molecules are away from the vicinity of the center. The liquid crystal molecules are oriented to be parallel to the substrate because of the potential difference between the pixel electrode 19 and the opposing electrode 34.

Therefore, the orientation direction of the liquid crystal in the pixel region 19L is oblique from the side of the insulating substrate 10 in the direction of an arrow 19La in FIG. 7, and the orientation direction of the liquid crystal in the pixel region 19R is oblique in the direction of an arrow 19Rb in FIG. 7. Accordingly, when the liquid crystal display panel is seen from the right or left direction, a viewing angle from either direction becomes large, so that a wide viewing angle can be realized. When the right and left pixel regions 19R, 19L have a different area, a viewing angle from, for example, the right side, becomes large, but a viewing angle from the left side becomes narrow. Therefore, the right and left pixel regions 19R, 19L are made to have the same area.

The liquid crystal molecules of the upper and lower pixel regions 19D, 19U are obliquely oriented from the side of the insulating substrate 10 toward the directions of arrows 19Dc, 19Ud. In order to have the same viewing angle from the right and left directions and also to have the same viewing angle when viewed from the upper and lower directions, it is desirable to form the pixel regions 19D, 19U with the same area.

Third Embodiment

Figure 9:
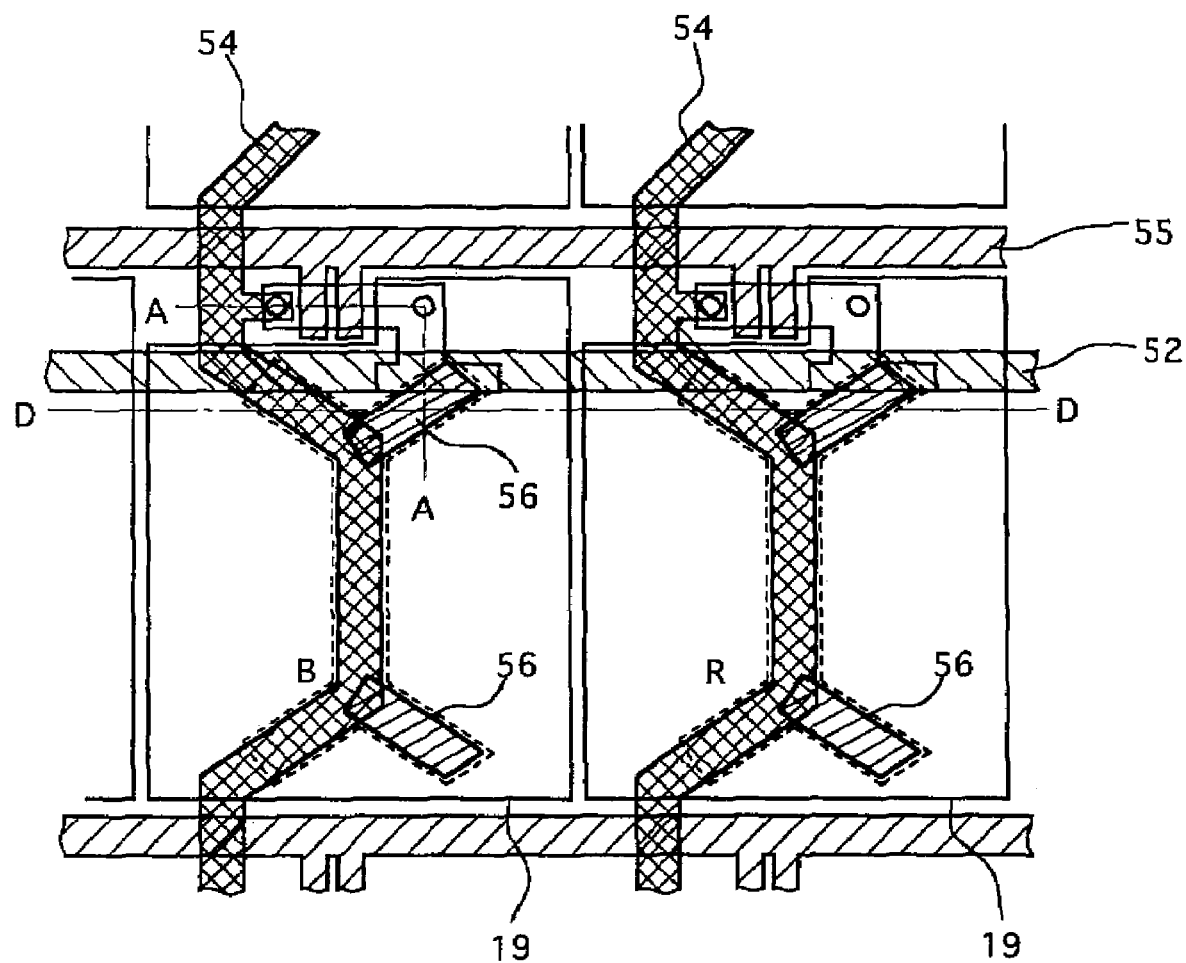
FIG. 9 is a plan diagram of a liquid crystal display device according to a third embodiment of the invention.
Figure 10:
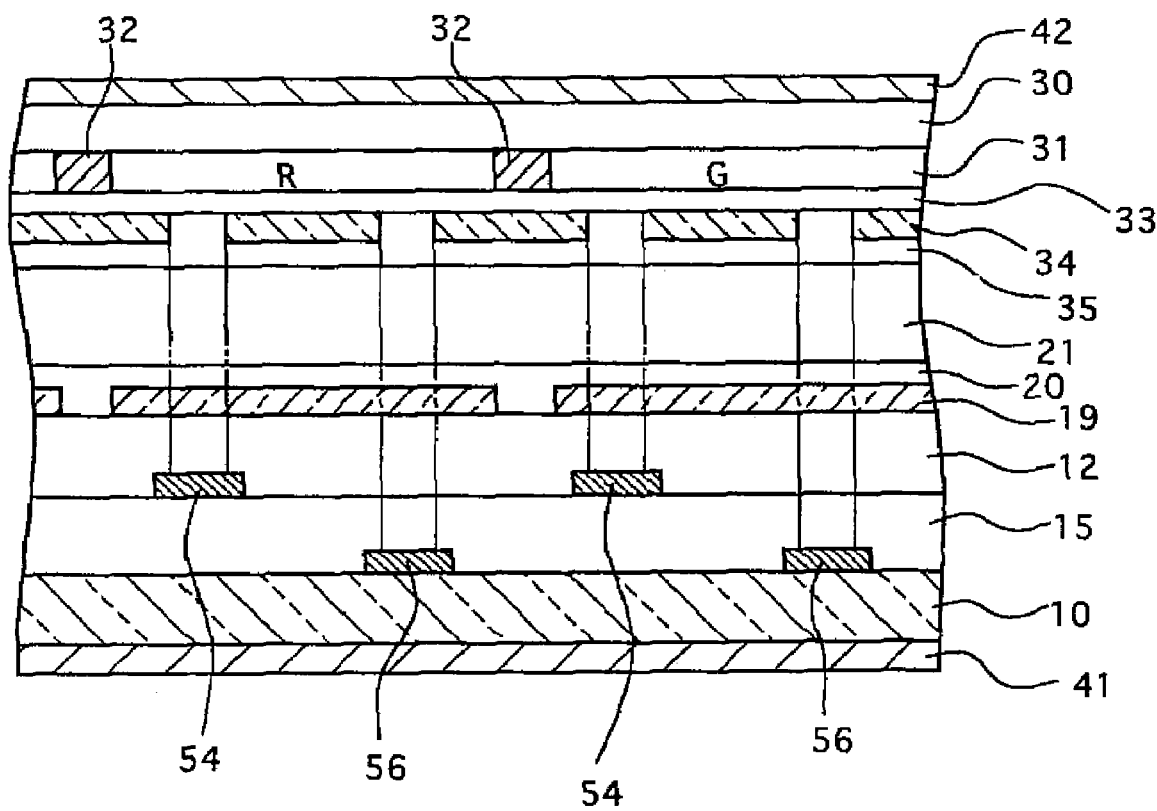
FIG. 10 is a sectional diagram of the liquid crystal display device taken along line D-D of FIG. 9.

FIG. 9 is a plan diagram of the third embodiment, and FIG. 10 is a sectional diagram taken along line D-D of FIG. 9. The subject matter of this embodiment is the same as the second embodiment. In the second embodiment, the overlap electrodes 37, 38 were formed by partly branching the gate signal line 55 and the storage capacitor electrode 53. This embodiment differs from that of the second embodiment in that a light-shielding film 56 is made of a light-shielding material such as metal which is different from the gate signal line 55 and the storage capacitor electrode 53. Thus, the same effect as in the second embodiment can be obtained by using a different body to form the light-shielding film 56.

In this embodiment, the light-shielding film 56 is described as being disposed on a layer different from the drain signal line, but the present invention is not limited to such a configuration. The light-shielding layer may be formed on the same layer as the drain signal line at the same time when the drain signal line is formed and may be formed with the drain signal line in one body, or the light-shielding film may be formed on the side of the second substrate 30, for example, on the same layer as the black matrix 32.

Fourth Embodiment

Figure 11:
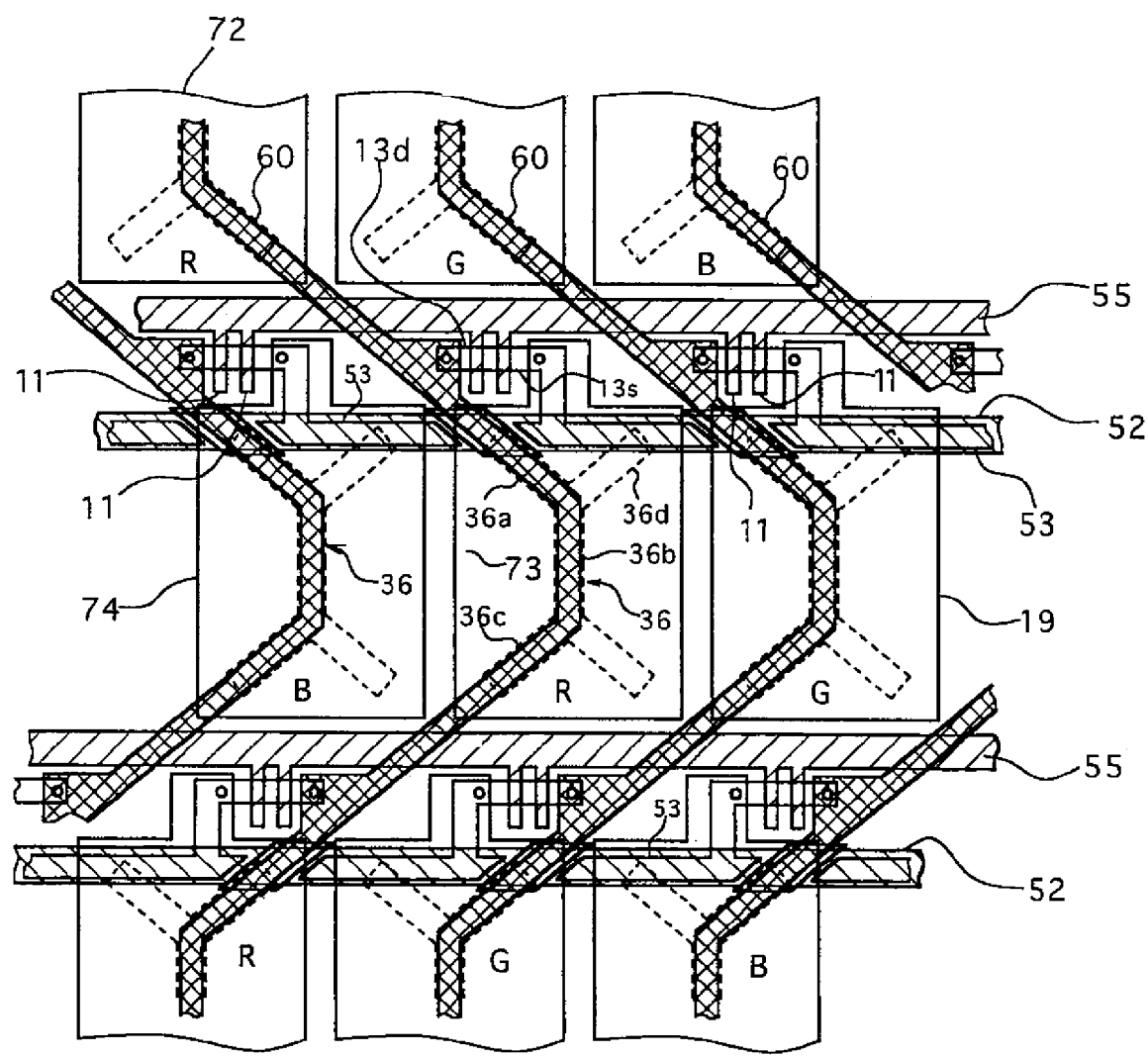
FIG. 11 is a plan diagram of a liquid crystal display device according to a fourth embodiment of the invention.

FIG. 11 shows a plan diagram of the fourth embodiment. This embodiment adopts a delta arrangement in that the pixel electrodes 19 are connected to the same drain signal line 60, and the respective pixel electrodes 19 in the adjacent row are displaced by 1.5 pixels in the extending direction of a gate signal line 51. The delta arrangement is extensively used in an audiovisual field for DSC (digital still camera) and the like used to show video.

In the delta arrangement, when attention is directed to one specific row, respective colors of a pixel (R) for red color, a pixel (G) for green color and a pixel (B) for blue color are repeatedly arranged in this order, and in the next row, the same respective colors as those in the first row are repeatedly arranged in the same way except that the arranged positions of the respective colors are displaced to the right by 1.5 pixels with respect to the first row.

As shown in FIG. 11, a TFT is formed in the vicinity of the intersection between the gate signal line 55 which is linearly arranged from side to side and the drain signal line 60 which is connected to the same color pixels. This TFT has the gate electrode 11 which forms a part of the gate signal line 55 and the semiconductor layer 13 made of polysilicon which comprises the drain 13d connected to the drain signal line 60 and the source 13s connected to the pixel electrode 19. The drain signal line 60 is connected to the same color pixels which are displaced by the segment of 1.5 pixels in the direction of the column. Accordingly, the drain signal line 60 arranged so as to overlap the orientation control window 36 of each pixel is bent from a corner of the pixel electrode 19 toward the vicinity of the center and, as a whole, extends in a zigzag form so to cross the respective center regions of the same color pixels displaced by 1.5 pixels. In the same way as in the previous embodiments, the orientation control window 36 has a shape that one of two conjoined letters 'Y' with portions extending toward the corners of the pixel electrode and in the vertical direction (the portion extending along the sides of the pixels). The drain signal line 60 extended from the upper left of the pixel extends in a lower right direction along the region 36a at the upper left of the orientation control window 36, in a vertical direction along the region 36b and in a lower left direction along the region 36c and leaves the pixel from the lower left of the pixel electrode. Subsequently, the drain signal line 60 enters the next pixel which is displaced to the left by 1.5 pixels from its upper right section, extends in a lower left direction along the region 36d at the upper right section of the orientation control window 36, in a vertical direction along the region 36b and in a lower right direction along the lower right region 36e and leaves the pixel. The same pattern is repeated so that the drain signal line 60 is disposed to extend in a zigzag pattern in the direction of the column.

At the intersection of the storage capacitor signal line 52 and a drain signal line 50, a short-circuit prevention film 57 is intervened in a shape corresponding to the intersection between them to prevent the signal lines 52, 50 from short circuiting. The short-circuit prevention film 57 can be formed of a semiconductor film, for example, a polysilicon film or the like which is used as the active layer of the TFT.

Thus, the short-circuit prevention film 57 can be formed without adding a special process by applying the material which is used for the TFT to the short-circuit prevention film 57. Since the drain signal line 60 is arranged as described above, the drain signal line 60 in the delta arrangement can be arranged in the shortest distance. Therefore, there is also provided an effect that any increase of wiring resistance caused by a long drain signal line 60 can be prevented.

Further, a separate light-shielding film may be formed at the orientation control window 36 where light is not shielded in the same way as in the second and third embodiments.

Fifth Embodiment

As described above, in the fourth embodiment the drain signal line 60 can be arranged along the shortest length according to the delta arrangement with the pixels displaced by 1.5 pixels, but the drain signal line 60 is still very long and has a large wiring resistance. Especially, a high-resolution liquid crystal display device requires that the drain signal line 60 be made thin, so that a video signal is rounded (delayed) due to the wiring resistance at a part away from the signal input section, and normal display may not be obtainable.

Where the drain signal line 60 is extended from a single pixel 72 to the next pixel 73 in order to connect the respective pixels arranged in the pattern displaced by 1.5 pixels, its oblique angle is gentle as compared with its extension to a pixel 74 positioned just below the pixel 72. Specifically, the storage capacitor electrode 53 which forms the capacitor with the storage capacitor signal line 52 has a small intersection angle with respect to the storage capacitor signal line 52, so that the area of the overlapped section also becomes small. Thus, despite the ratio of sacrificing the aperture ratio, a large storage capacitor cannot be obtained, and efficiency is not high. As a result, should TFT current leak, voltage applied to the liquid crystal may not be retained.

Figure 12:
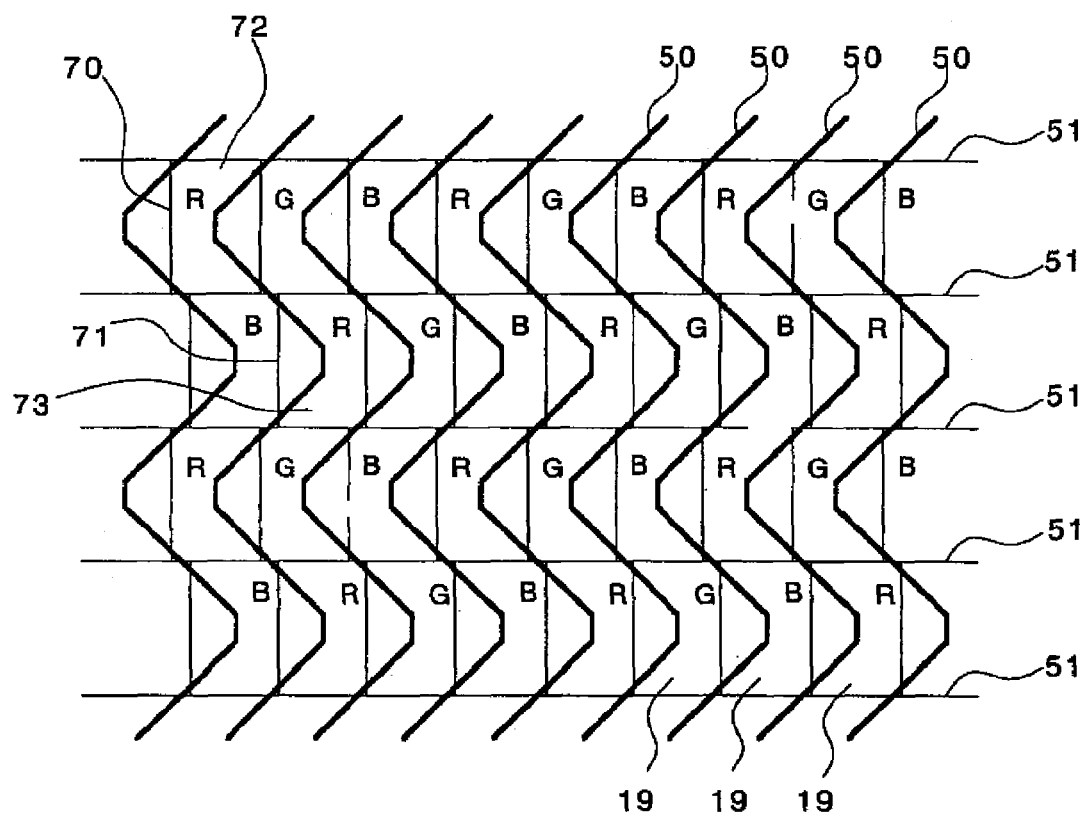
FIG. 12 is a plan diagram of a layout of pixels and drain signal lines of a liquid crystal display device according to a fifth embodiment of the invention.
Figure 13:
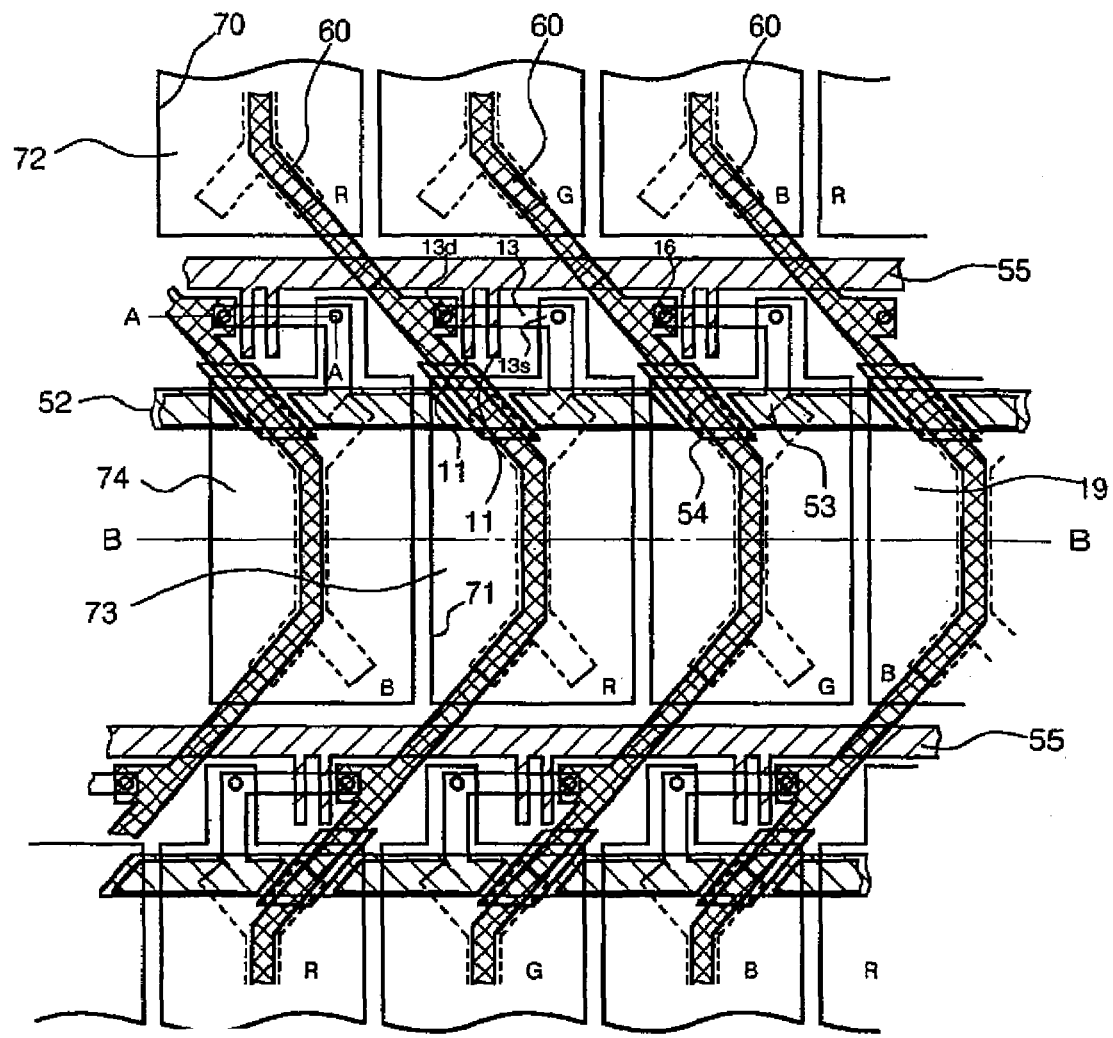
FIG. 13 is a plan diagram of the liquid crystal display device according to the fifth embodiment of the invention.

The fifth embodiment, then, efficiently forms a large storage capacitor which is sufficient to retain the orientation of the liquid crystal for a predetermined period even if TFT had a leak current. FIG. 12 is a plan diagram showing a positional relation of pixels, drain signal lines and gate signal lines of the liquid crystal displace device of this embodiment. FIG. 13 is a partially expanded plan diagram showing the vicinity of some pixels of the liquid crystal display device.

As shown in FIG. 12 and FIG. 13, the pixels 19 of the liquid crystal display device are arranged in a matrix. In the first row at the top in the drawings, a pixel (R) showing red color, a pixel (G) showing green color and a pixel (B) showing blue color are repeatedly arranged in this order. In the next row below the first row, the same three color pixels are repeatedly arranged in the same way, except that the arranged positions of the respective colors are displaced to the right by 1.2 pixels with respect to the first row.

Therefore, the drain signal line 50 which is vertically extended to connect the pixels to supply the same drain signal can be made to have a much shorter wiring length than in the fourth embodiment. Accordingly, the wiring resistance can be lowered, and a uniform display can be created over the entire surface of the display area.

In this embodiment, since the vertically neighboring pixels 19 which are connected to the same drain signal line 60 are displaced by only 1.2 pixels from each other between adjacent rows, the drain signal line 60 has a smaller bending angle. Since the capacitor electrode 53 is formed to oppose a region not overlapped with the drain signal line 60 of the storage capacitor signal line 52, a parallelogram surrounded by the drain signal line 60 and the storage capacitor signal line 52 is formed. Therefore, the drain signal line 60 has a small bending angle, the parallelogram of the capacitor electrode 53 has a small inclination at its both sides and comes to have a shape similar to rectangular. As the tops facing each other with the center therebetween are fixed depending on the pixel size, the pitch, and the width of the storage capacitor signal line 52, when the parallelogram of the capacitor electrode 53 has a large inclination at both sides, the area of the parallelogram grows small. Therefore, according to this embodiment capable of decreasing the bending angle of the drain signal line 60, the capacitor electrode 53 can have a large area, and the storage capacitor signal line 52 and the capacitor electrode 53 can have a large overlapped area. In this way, the storage capacitor is increased, and the voltage applied to the liquid crystal can be retained even if TFT has a leak voltage. The liquid crystal can be stably driven, and a quality display can be obtained.

Because the drain signal line 60 has a small bending angle, the drain signal line 60 has a much shorter wiring length as compared with the aforesaid embodiments. Therefore, the wiring resistance can be decreased, and more uniform display can be obtained on the entire surface of the display area.

Also, the overlap area of the storage capacitor signal line 52 and the capacitor electrode 53 can be made large, and driving stability of the liquid crystal can be further improved.

In the above description of a preferred embodiment, the pixels of the adjacent rows connected to the same drain signal line are displaced by 1.2 pixels in the row direction. However, the invention is not limited to such an arrangement. When the displacement is smaller than 1.5 pixels forming the delta arrangement, preferably in a range of one pixel or more and less than 1.5 pixels, high-resolution display can be obtained depending on the delta arrangement.

Sixth Embodiment

Figure 14:
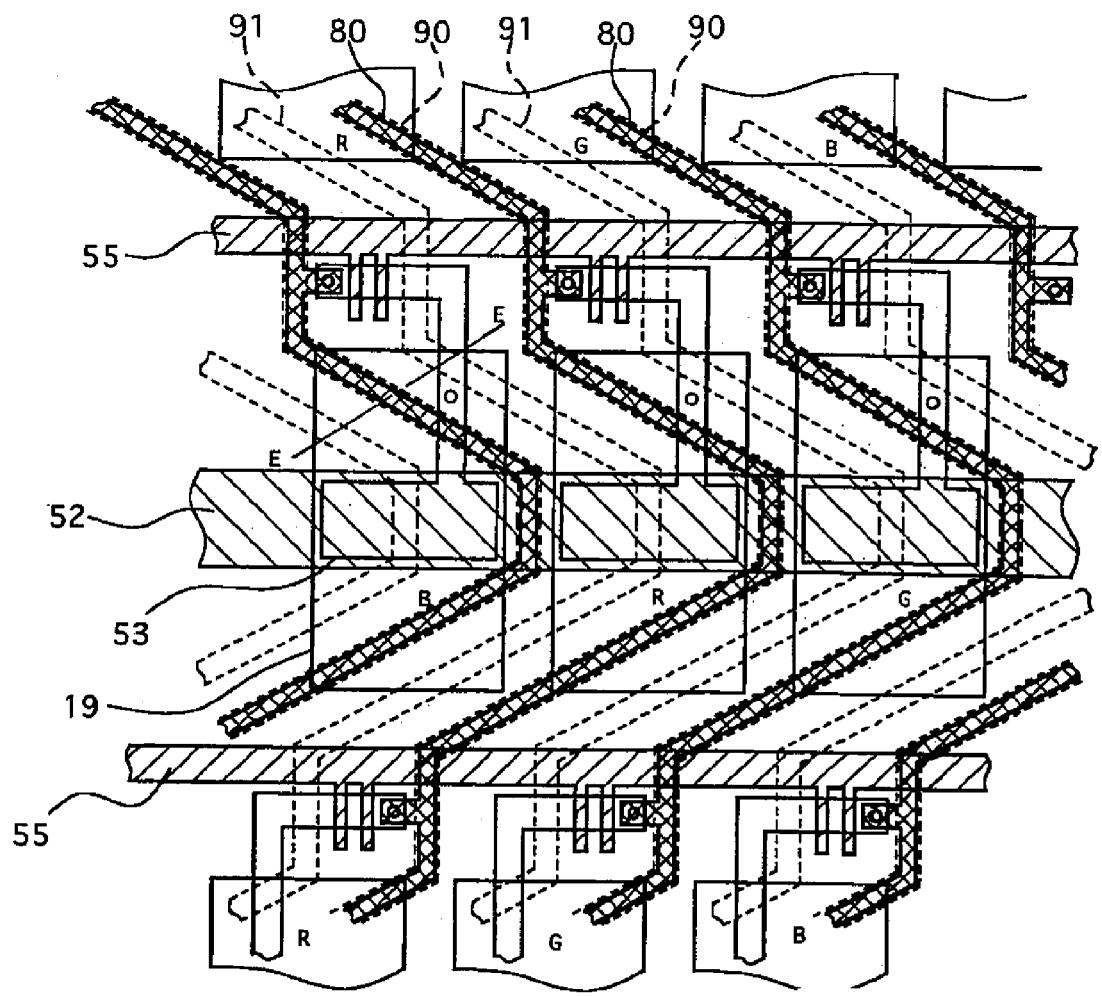
FIG. 14 is a plan diagram of a liquid crystal display device according to a sixth embodiment of the invention.
Figure 15:
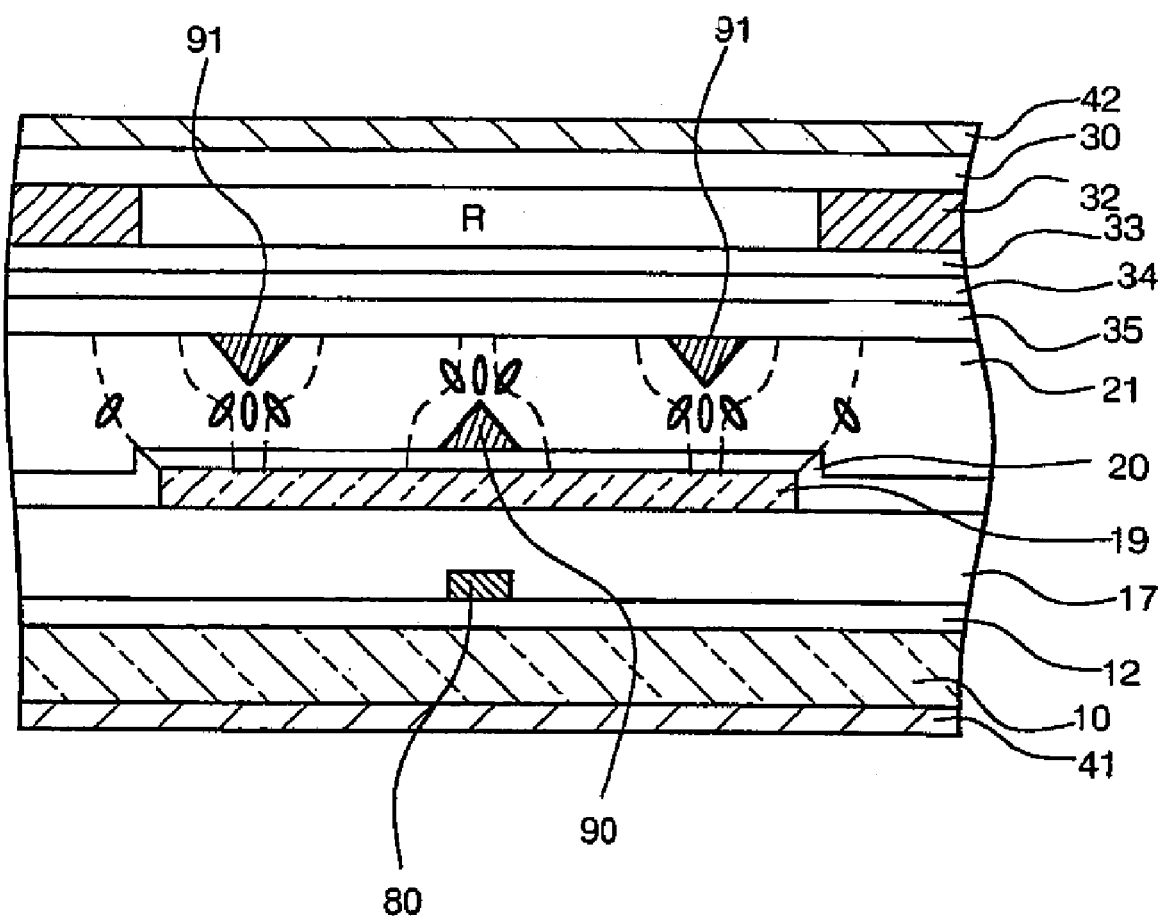
FIG. 15 is a sectional diagram of the liquid crystal display device taken along line E-E of FIG. 14.

In the aforesaid first to fifth embodiments, the orientation control window 36 was used as the orientation divider. However, the orientation divider is not limited to the orientation control window 36. This embodiment has an orientation control slope formed as the orientation divider. FIG. 14 is a plan diagram of the liquid crystal display device of this embodiment, and FIG. 15 is a sectional diagram of FIG. 14.

In this embodiment, the orientation direction of the liquid crystal is divided by an orientation control slope 90. Specifically, the orientation control slope 90 is one example of the orientation divider. Since the orientation control slope 90 is an insulating substance, an electric line of force produced between the pixel electrode 19 and the opposing electrode 34 avoids the orientation control slope 90 in an oblique direction as indicated by dotted lines in FIG. 15. Thus, the orientation direction of the liquid crystal in the pixel is divided in the same way as the orientation control window 36 of the first to fifth embodiments, and a viewing angle can be expanded. The orientation control slope is described in detail in Japanese Patent Application No. Hei 6-104044, and its description is not repeated here.

A first orientation control slope 90 is formed on the side of the first substrate 10 to extend from the upper left of a pixel in a particular row to its lower right so to cross the pixel to leave the pixel temporarily at the middle right side of the pixel, to bend so to reenter the same pixel region, to cross it again in the lower left direction and to leave the pixel. A second orientation control slope 91 is formed on the side of the second substrate 30 substantially in parallel to the first orientation control slope 90. The orientation control slope 90 and the orientation control slope 91 formed on the side of the second substrate are alternately formed as shown in the plan diagram of FIG. 14. The orientation control slopes 90, 91 are insulating and formed on the vertical orientation films 20, 35 respectively.

In those orientation control slopes, the major axes of the liquid crystal molecules just above the orientation control slopes remain es directed in the vertical direction so to form a region wherein light is shielded. Then, this embodiment forms drain signal lines 80 to overlap with the orientation control slopes 90. With such an arrangement, the light-shielding region can be formed in the overlapped form in the same way as in the aforesaid embodiments, so that the aperture ratio can be improved. Further, the orientation control slope 90 temporarily crosses the pixel and bends outside of the pixel electrode. Because the drain signal line is formed along the orientation control slope 90, it also bends outside of the pixel electrodes. At the bent part of the drain signal line within the pixel, the electric field tends to concentrate but since the bent part is outside of the pixel electrode, the possibility of influencing on the orientation of the liquid crystal is lowered.

Figure 17:
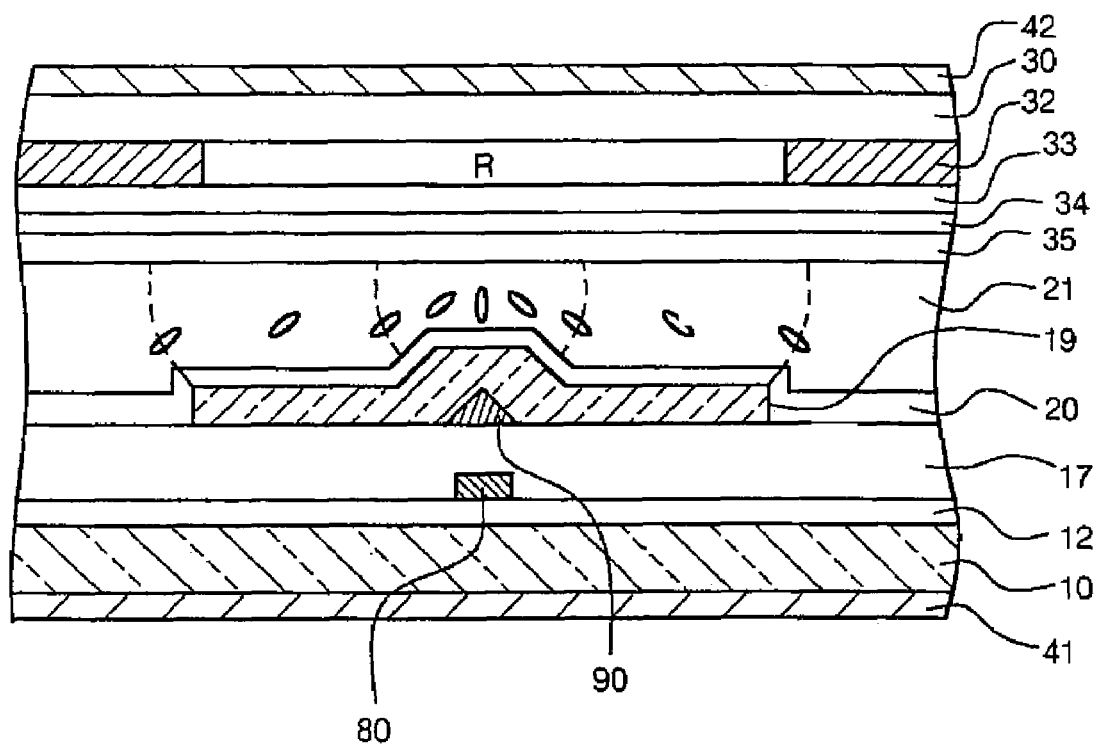
FIG. 17 is a sectional diagram of a liquid crystal display device according to another embodiment of the invention.

The orientation control slope 90 may be formed between the pixel electrode 19 and the first substrate 10 to form a slope on the surface of the pixel electrode 19, as shown in FIG. 17 for example. In this case, an oblique electric field is produced because of the slope of the pixel electrode. Meanwhile, the orientation control slope 90 may be formed between the pixel electrode 19 and the vertical orientation film 20. In this case, the orientation is divided by the sloped vertical orientation film 20. In any event, since the region just above the orientation control slope 90 keeps to shield light, the aperture ratio can be improved by disposing the drain signal line 80 there.

The orientation control slope 90 may have the same "conjoined Y" shape as in the first to fifth embodiments. However, the orientation control slope 36 may also be formed in a shape such that the region extending to the upper right and the region extending to the lower right are connected, as in this embodiment for example.

Figure 16:
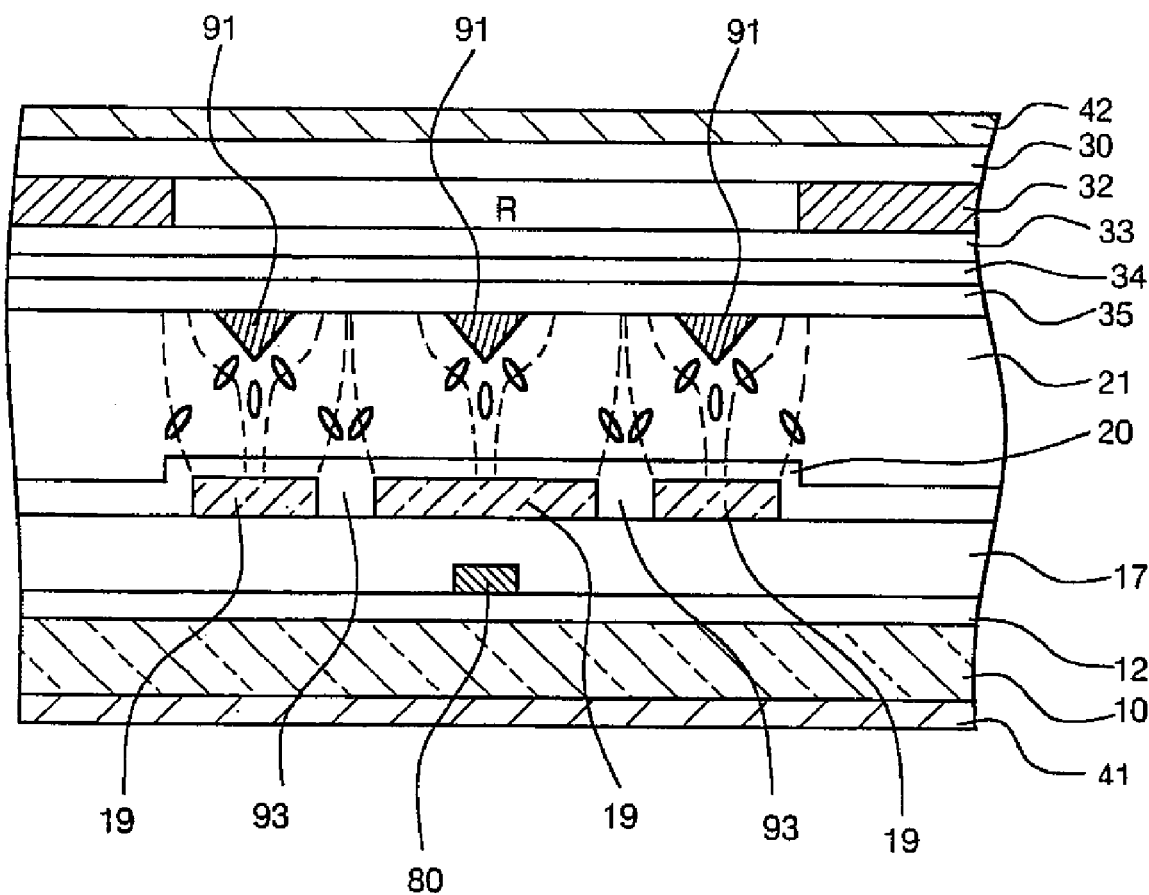
FIG. 16 is a sectional diagram of a liquid crystal display device according to another embodiment of the invention.

Naturally, the orientation control window and the orientation control slope may be combined as the orientation divider. For example, orientation control windows 93 are formed in the pixel electrode 19 and the orientation control slopes 91 are formed on the opposing electrode 34 as shown in the sectional diagram of FIG. 16. FIG. 16 is a sectional diagram showing a single pixel in which the pixel electrode 19 is shown in multiple numbers divided by the orientation control windows 93 but connected into one at a region not shown.

In FIG. 16, the region just below the orientation control slope 91 is a boundary in the orientation direction of the liquid crystal and forms a light-shielding region. And, the drain signal line 80 is disposed there to overlap with the light-shielding region, so that the aperture ratio can be improved. The orientation control window 93 on the pixel electrode 19 is also a boundary in the orientation direction to form the light-shielding region. By disposing the drain signal line 80 there, the distance between the orientation control window 93 and the drain signal line 80 becomes so close that the orientation of the liquid crystal is disturbed by the electric field produced from the drain signal line 80 different from the aforesaid first to fifth embodiments in which the liquid crystal and the like are present therebetween. Therefore, the drain signal line 80 is most preferably disposed on an area which is the boundary of the orientation and where the pixel electrode 19 is formed.

The subject matter of the present invention seen from the aforesaid respective embodiments is that wiring is disposed to overlap with the boundary in the orientation direction produced by the orientation divider. Specifically, the boundary in the orientation direction is produced whatever orientation divider is adopted, and the liquid crystal is not oriented in the vicinity of the boundary. This boundary forms a region always shielding light. Therefore, the wiring is overlapped as a light-shielding region with the boundary to decrease the light-shielding area, and the aperture ratio can be improved.

It is to be understood that the sixth embodiment can adopt the delta arrangement of color pixels to perform the fourth and fifth embodiments in combination.

While there have been described that what are at present considered to be preferred embodiments of the invention, it is to be understood that various modifications may be made thereto, and it is intended that the appended claims cover all such modifications as fall within the true spirit and scope of the invention.

What is claimed is:

1. A liquid crystal display device of a normally black type, in which
   a first substrate and a second substrate are disposed so as to oppose each other;
   liquid crystal having a negative anisotropy of dielectric constant is sealed between the first substrate and the second substrate;
   the first substrate has light-shielding lines and a plurality of pixel electrodes which are formed for respective pixels;
   the second substrate has an opposing electrode;
   a rubbingless vertical orientation film is formed on each of a liquid crystal side of the pixel electrodes and a liquid crystal side of the opposing electrode;
   an orientation control window extends in an elongated shape in a plurality of different directions within a single pixel for dividing the orientation direction of the liquid crystal into a plurality of directions within the single pixel; and
   the light-shielding line is disposed so as to overlap with only a portion of the orientation control window, and the light-shielding line is continuous in the region overlapping with the orientation control window and does not terminate in the overlapping region.

2. A liquid crystal display device according to claim 1, wherein
   the orientation control window divides the orientation direction of the liquid crystal by generating an electric field which is inclined with respect to a normal line of the pixel electrode anchor the opposing electrode.

3. A liquid crystal display device according to claim 1, wherein the width of the light-shielding line is different from that of the orientation control window in the region where the line overlaps with the orientation control window.

4. A liquid crystal display device according to claim 1, wherein
the orientation control window is provided on the side of the second substrate.

5. A liquid crystal display device according to claim 4, wherein
the orientation control window is formed in the opposing electrode.

6. A liquid crystal display device according to claim 1, wherein
the orientation control window is provided on the side of the first substrate.

7. A liquid crystal display device according to claim 6, wherein
the orientation control window is provided in the pixel electrode.

8. A liquid crystal display device according to claim 1, wherein
the light-shielding line is provided along the direction in which the orientation control window extends.

9. A liquid crystal display device according to claim 8, wherein
the orientation control window divides the orientation direction of the liquid crystal by generating an electric field which is inclined with respect to a normal line of the pixel electrode and/or the opposing electrode.

10. A liquid crystal display device according to claim 8, wherein
the width of the light-shielding line is different from that of the orientation control window in the region where the light-shielding line overlaps with the orientation control window.

11. A liquid crystal display device according to claim 8, wherein
the orientation control window is provided on the side of the second substrate.

12. A liquid crystal display device according to claim 11, wherein
the orientation control window is formed in the opposing electrode.

13. A liquid crystal display device according to claim 8, wherein
the orientation control window is provided on the side of the first substrate.

14. A liquid crystal display device according to claim 13, wherein the orientation control window is provided on the pixel electrode.

* * * * *